R. E. RELYEA.
VEHICLE BRAKE.
APPLICATION FILED DEC. 19, 1914.
1,143,996.
Patented June 22, 1915.
2 SHEETS—SHEET 2.
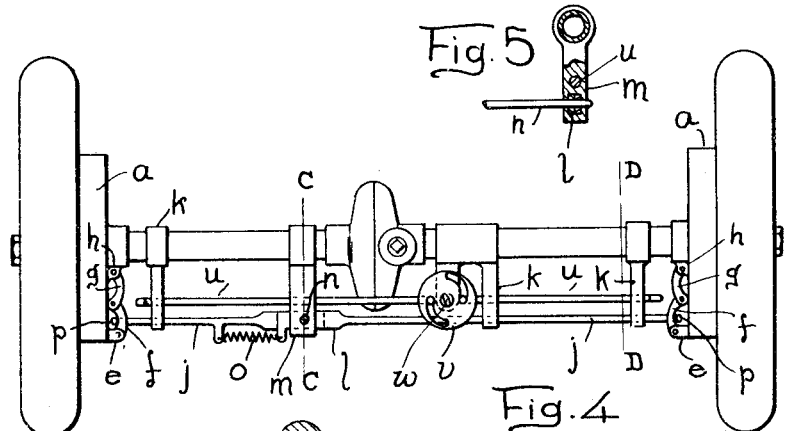
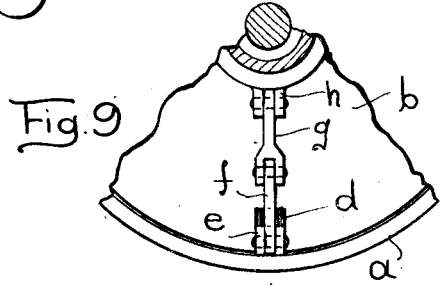
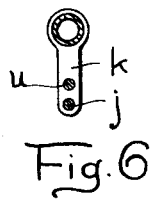
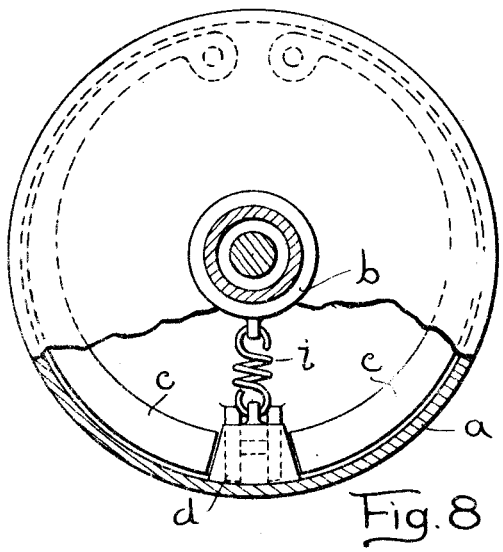
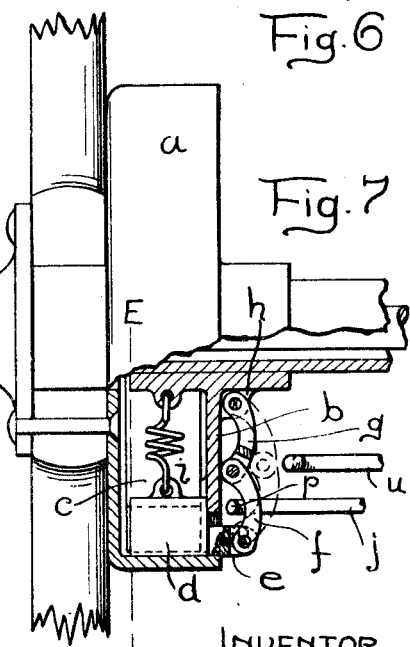
WITNESSES
Robert N. Van Bokenta
Virginia C. Spratt.
INVENTOR
Ralph E. Relyea
BY Ratzemond A. Parker
ATTORNEY

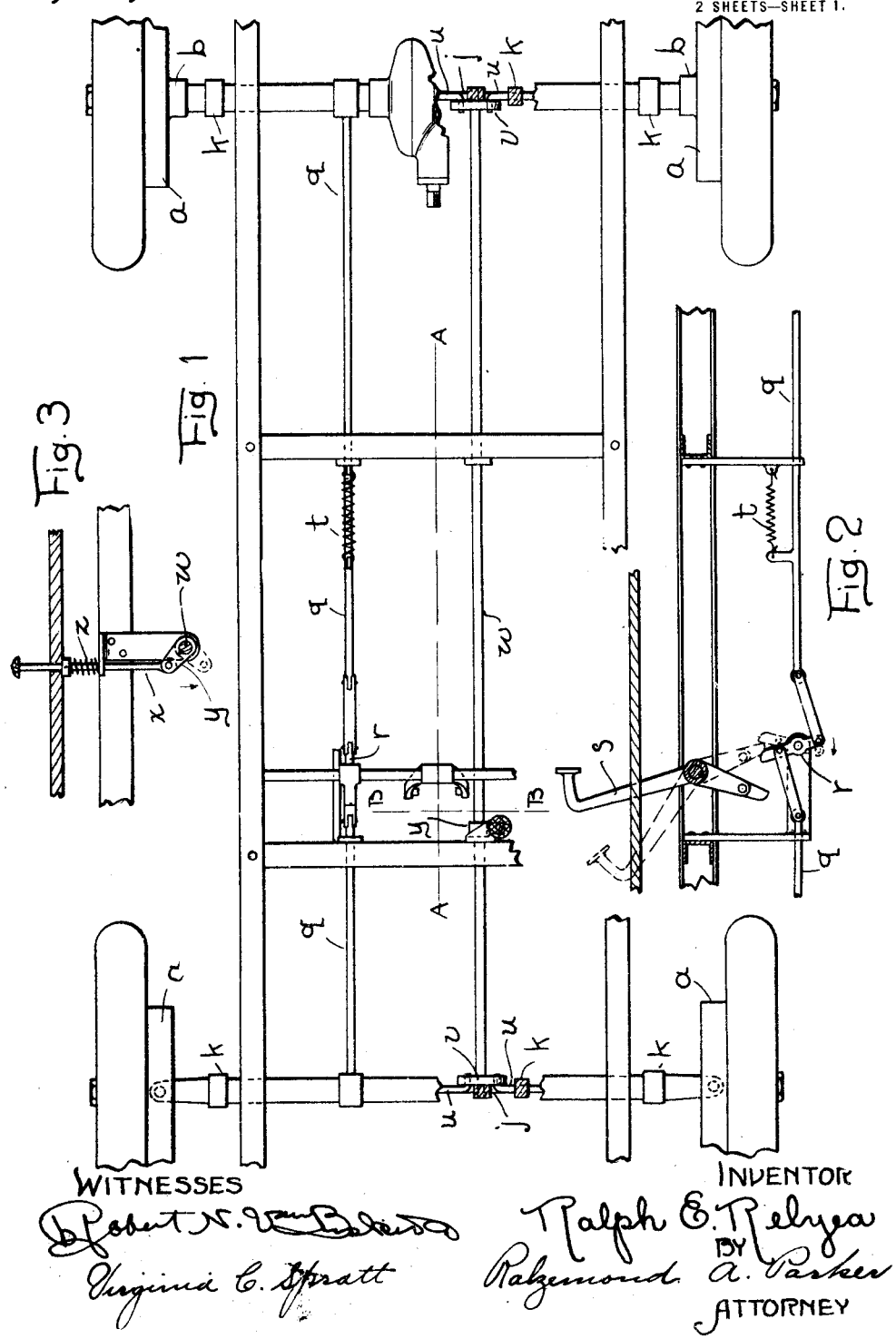

UNITED STATES PATENT OFFICE.

RALPH E. RELYEA, OF DETROIT, MICHIGAN.

VEHICLE-BRAKE.

1,143,996.

Specification of Letters Patent.   Patented June 22, 1915.

Application filed December 19, 1914.   Serial No. 878,146.

*To all whom it may concern:*

Be it known that I, RALPH E. RELYEA, a citizen of the United States, residing at Detroit, county of Wayne, State of Michigan, have invented a certain new and useful Improvement in Vehicle-Brakes, and declare the following to be a full, clear, and exact description of the same, such as will enable others skilled in the art to which it pertains to make and use the same, reference being had to the accompanying drawings, which form a part of this specification.

This invention relates to vehicle brakes and has for its object what is believed to be a novel manner of applying the brakes and releasing them.

Figure 1 is a plan view with the brakes mounted on an automobile chassis. Fig. 2 is a section on the line A A of Fig. 1. Fig. 3 is a section on the line B B of Fig. 1. Fig. 4 is a view of the rear axle of an automobile with the brake appliances in place. The view is taken from the front of the axle. Fig. 5 is a section on the line C C of Fig. 4. Fig. 6 is a section on the line D D of Fig. 4. Fig. 7 is a fragmentary view of the wheel and rear axle showing the brake drum broken away to disclose the braking apparatus. Fig. 8 is a view of the brake drum from the wheel side with the lower part sectioned, the section being taken on the line E E of Fig. 7. Fig. 9 is a fragmentary view of the stationary brake collar which carries the brake shoes and fits within the brake drum. It shows the toggle joint.

Referring to Figs. 7 and 8, $a$ indicates the brake drum, $b$ the brake collar, to which are pivoted the two brake shoes $c$, $c$. $d$ is a wedge by which they may be expanded to engage the inner surface of the brake drum $a$. The wedge $d$ is provided with a bifurcated projection $e$ that straddles the end of the toggle lever $f$ and is pivoted thereto. The toggle lever $f$ and its companion toggle lever $g$ are pivoted together at their meeting ends and the toggle lever $g$ is pivoted at its other end between the two lugs of the bifurcated projection $h$ of the brake collar $b$. The pull spring $i$ normally tends to raise the wedge and expand the shoes $c$, $c$, but such a tendency is resisted by the toggle levers $f$ and $g$ as shown in Fig. 7, for they are at the left of their dead center, and the wall of the brake collar $b$ prevents them from being pulled any farther to the left. The brake collar, therefore, prevents the brakes being applied. However, if the toggle levers are seized near their joint and pulled to the right beyond the dead center, then the pull of the spring $i$ will not be resisted as the toggle levers can pivot freely. This operation I use to apply the brakes, and I pull the toggle levers to the right and free the wedge thus: The two rods $j$, $j$ (Fig. 4) are held in slidable relation by the three depending brackets $k$, $k$. Their overlapping flattened terminals $l$ are held slidably by the bracket $m$, and when the pin $n$ (Fig. 5) is retracted, the rods pull together under the influence of the spring $o$. Each of the rods is provided with a hook $p$ which hooks over the toggle lever $f$, and consequently when the pin $n$ is retracted and the rods $j$, $j$ pull together, the toggles are thrown beyond their dead center and away from the brake collar. As already explained, this frees the wedge $d$ and the pull springs $i$ raise the wedge and spread the shoes, thereby providing the necessary friction for braking.

The pins $n$ are withdrawn from the rods $j$, $j$ in the following manner: Referring to Figs. 1 and 2, it will be seen that the pins are in reality the terminals of the reach rods $q$, $q$, one of which reaches to the rear axle and the other of which reaches to the front axle. One of these reach rods is linked to a lever $r$ below the fulcrum point, and the other rod is linked to the lever $r$ above the fulcrum point. This lever $r$ is operated by the clutch pedal $s$. Only a part of the full permissible swing of the clutch lever is necessary to throw the clutch out. The continuation of such swing causes a depending end of the clutch lever to engage the end of the lever $r$ thereby throwing it back to the position shown in the dotted lines of Fig. 2. Upon the return stroke of the clutch pedal, the pull spring $t$ serves to return the reach rods $q$ to their initial positions. Of course they cannot return until the slots in the flattened terminals of the rods $j$, $j$ register. These slots will not register as long as the rods $j$, $j$ are pulled together by the spring $o$. However, these rods will be separated when the toggle is again thrown past its dead center and against the brake collar so as to lock the wedge from spreading the brake shoes. This is effected by the push rods $u$, $u$ (Fig. 4). When the slotted cam $v$ is given a part rotation, it will force the push rods away from each other, and thereby push the toggle levers when in the position shown in the dotted lines of Fig. 7, past their dead center and against the brake collar $b$. The action of the toggle levers also separates the rods $j, j$ as the toggle levers engage with the hook terminals $p$ of the rods. The cam $v$ is rotated by the rock shaft $w$ (Fig. 1), which in turn is rocked by the plunger $x$ and the rock arm $y$ as shown in Fig. 3. The spring $z$ returns the plunger, the rock arm, rock shaft and cam to their original positions after the brakes have been released.

It will be noticed that my brakes and the brake operating apparatus are applied to all four wheels of the car and that they are simultaneously applied and released. This affords larger braking surface, and inasmuch as all four wheels are braked simultaneously, a quicker stopping of the car is effected. By reason of the clearance between the hooks on the ends of the rods $j, j$ and $u, u$ and the toggle levers, the front wheels may turn without interfering with the brake operating apparatus.

What I claim is:

1. In apparatus of the class described, the combination of a brake drum, a brake collar, a shoe movably held by said brake collar and arranged to engage with the brake drum when desired, a spring-controlled device normally tending to force the shoe into engagement with the brake drum, a pair of toggle levers connected with said spring-controlled device so that when they are on one side of their dead center and bear against the brake collar, they resist the efforts of the spring to cause the said spring-controlled device to apply the shoe to the brake drum, and when on the other side of their dead center they allow the spring to cause the spring-controlled device to apply the brake shoe.

2. In apparatus of the class described, the combination of a brake drum, a brake collar, a pair of shoes pivoted thereto, a wedge for spreading the shoes, a spring normally tending to operate the wedge to spread the shoes, means for locking the wedge to prevent the action of the spring, and means for releasing the lock and for putting in on.

3. In apparatus of the class described, the combination of a brake drum, a brake collar, a pair of shoes pivoted to the brake collar, a wedge for spreading the shoes, a spring for operating the wedge and a pair of toggle levers which on one side of their dead center prevent the spring operating the wedge, while on the other side of their dead center allow the spring to operate the wedge, and means for drawing the toggle levers from one side to the other of their dead center to release or lock the wedge.

4. In apparatus of the class described, the combination of a brake drum, a brake collar, brake shoes pivoted thereto, a wedge for spreading the brake shoes, a spring for operating the wedge, and a pair of toggle levers connected with the wedge and which on one side of their dead center lock the wedge to prevent operation by the spring and on the other side of their dead center free the wedge to allow the spring to operate, draft connections for pulling the toggle levers beyond their dead center and away from the brake collar, and push connections for forcing the toggle levers beyond their dead center and back against the brake drum.

5. In apparatus of the class described, the combination of a brake drum, a brake collar, a pair of shoes pivoted thereto, a wedge for spreading the shoes, a spring normally tending to cause the wedge to spread the shoes, a pair of toggle levers which on the side of the dead center toward and against the brake collar, lock the wedge against the action of the sprin and on the side of their dead center away from the brake collar, allow the operation of the spring, draft connections for pulling the toggle levers away from the brake collar, push connections for forcing the toggle levers against the brake collar, a clutch pedal and connections for operating the draft connections, and a separate operating device for operating the push connections to release the brakes.

6. In apparatus of the class described, the combination of a brake drum, a brake collar, shoes pivoted thereto, a wedge for spreading the shoes, a spring for actuating the wedge, and a pair of toggle levers which on one side of their dead center lock the wedge against actuation by the spring and on the other side of their dead center allow the operation of the spring, a pair of spring pulled rods, a pin for preventing their being pulled together, the said rods engaging with the toggle levers to pull them past their dead center and to free the wedge, means for disengaging the pin from the rods to allow them to pull the toggle levers to free the wedge, a pair of push rods adapted to engage with the toggle levers to force them back beyond their dead center and to lock the wedge, and a cam for operating the push rods.

In testimony whereof, I sign this specification in the presence of two witnesses.

RALPH E. RELYEA.

Witnesses:
STUART C. BARNES,
VIRGINIA C. SPRATT.